(12) United States Patent
Ryan et al.

(10) Patent No.: US 10,499,774 B1
(45) Date of Patent: Dec. 10, 2019

(54) LIQUID DISPENSER

(71) Applicants: John Ryan, Pensacola, FL (US); Rodrigo Dill, Pensacola, FL (US)

(72) Inventors: John Ryan, Pensacola, FL (US); Rodrigo Dill, Pensacola, FL (US)

( * ) Notice: Subject to any disclaimer, the term of this patent is extended or adjusted under 35 U.S.C. 154(b) by 0 days.

(21) Appl. No.: 16/188,451

(22) Filed: Nov. 13, 2018

(51) Int. Cl.
*A47K 5/12* (2006.01)
*B60N 3/10* (2006.01)

(52) U.S. Cl.
CPC .............. *A47K 5/1205* (2013.01); *B60N 3/10* (2013.01)

(58) Field of Classification Search
CPC .................................. A47K 5/1205; B60N 3/10
USPC ........................................ 222/211, 205, 383.1
See application file for complete search history.

(56) References Cited

U.S. PATENT DOCUMENTS

| | | | | |
|---|---|---|---|---|
| 2,311,367 A * | 2/1943 | Chambers | .............. | A45D 34/04 141/20.5 |
| 2,774,517 A * | 12/1956 | Teegardin | ............ | A47K 5/1205 222/205 |
| 3,089,623 A * | 5/1963 | Padzieski | .............. | G01F 11/286 215/6 |
| 3,628,700 A * | 12/1971 | Dodoghue | ............ | B05B 7/0037 222/187 |
| 3,651,995 A * | 3/1972 | Chaney | ................. | A47G 19/183 222/211 |
| 4,106,673 A * | 8/1978 | Donoghue | ............ | G01F 11/286 222/207 |
| 4,212,332 A * | 7/1980 | Kutik | .................. | B05B 11/0005 141/98 |
| 5,330,081 A * | 7/1994 | Davenport | ............. | B65D 1/323 222/207 |
| 5,833,124 A * | 11/1998 | Groves | ................. | G01F 11/286 222/158 |
| 5,992,702 A * | 11/1999 | Shapiro | ..................... | A01K 7/00 222/192 |
| 6,330,960 B1 * | 12/2001 | Faughey | .............. | B65D 50/045 222/158 |
| 7,850,050 B2 * | 12/2010 | Brown | .................. | G01F 11/286 222/205 |
| 8,579,164 B1 * | 11/2013 | Sanguinet | ............. | G01F 11/286 222/205 |
| 2011/0079613 A1 * | 4/2011 | Chih | ...................... | G01F 11/028 222/158 |
| 2015/0090738 A1 * | 4/2015 | Caporale | .............. | B67D 7/0288 222/205 |

* cited by examiner

*Primary Examiner* — Patrick M. Buechner
*Assistant Examiner* — Michael J. Melaragno
(74) *Attorney, Agent, or Firm* — Peter Loffler

(57) ABSTRACT

A liquid dispenser for dispensing a liquid such as a hand sanitizer uses a receptacle that is dimensioned to properly fit within a typical vehicle cup holder. A receptacle cap is attached to the top of the receptacle. A pumping system passes through the receptacle cap so as to have a dip tube disposed within the receptacle and an actuator located above the receptacle cap. Actuation of the actuator draws liquid from the receptacle and dispenses the liquid onto a user's hand through a discharge portion of the actuator. Spilled liquid is captured within a collection pool defined on a upper surface of the receptacle cap. An protective dome cap is attached to an upper portion of the receptacle cap, has an opening therein for access to the discharge port, and can be pressed downwardly to actuate the pumping system.

7 Claims, 5 Drawing Sheets

LIQUID DISPENSER

BACKGROUND OF THE INVENTION

1. Field of the Invention

The present invention relates to a dispenser for dispensing liquids, especially skin sanitizer, wherein the dispenser is sized and dimensioned to be received within a typical cup holder found in modern vehicles.

2. Background of the Prior Art

Many parents who have tried to feed a child in their vehicle are acutely aware of a recurring problem. The child is in the vehicle fresh from some activity that has caused his or her hands to become dirty and germ laden. The parent has the child clean his or her hands prior to touching the food that is about to be consumed. Typically, hand cleaning comprises squirting a small amount of hand sanitizer onto the child's hands and having the child rub their hands together, and then allowing for a few seconds of air drying. The hand sanitizer is kept in a small disposable squeeze bottle. This tried and true method of hand cleaning works extraordinary well and is second nature to parent and child alike prior to touching any food. The problem rests in the fact that when needed, the squeeze bottle is nowhere to be found. The bottle has fallen from its usual semi-permanent perch within the vehicle to a location that is either difficult for the driver to reach, such as onto the passenger side floor board, or to a location unknown to the driver, such as underneath one of the vehicle's seats. The driver, if with only child passengers and no other adult is left with several choices. The driver can simply let the child eat without hand cleaning, which may be acceptable in some circumstances such as when the child has just been picked up from school and cleaned his or her hands just prior to the end of the school day. However, often the child has previously engaged in an activity that screams for hand cleaning, such as playing in the park or at a petting zoo. The parent can pull the vehicle over and search for the wayward squeeze bottle. While effective, this solution for squeeze bottle retrieval can be fraught with peril if the vehicle is traveling down a high speed road, such as an interstate or otherwise where there is no safe place to pull over. Another solution for squeeze bottle retrieval is to perform driver gymnastics as the driver either stretches for the squeeze bottle sighted in the distance or blindly searches about the vicinity of the driver's seat in hopes of tactilely locating and thereafter retrieving the lost squeeze bottle. At best, this solution is careless, at worst, outright dangerous. Some drivers have the child unbuckle and search about for the squeeze bottle, which is also dangerous and ill advised.

Additional problems arise in the delivery of the hand sanitizer. Many parents have the child hold their hand toward the driver and the driver squeezes the hand sanitizer onto the child's hands. This not only distracts the driver, possibly leading to a vehicle crash, but often results in missing of the hands with the hand sanitizer falling onto the floor. This is wasteful of product and keeps the driver distracted for that much longer. Further problems can occur if the driver passes the squeeze bottle to the child or the bottle is passed from one child to another. The bottle can be dropped requiring retrieval with possible exposure to the above described problems.

What is needed is a hand sanitizer delivery system for use in a vehicle that avoids the above described problems found in the art. Such a delivery system must be easily located and positioned within the vehicle so that the delivery system tends not to escape from the vicinity of the driver so as to all but eliminate the need for a potentially dangerous search and rescue mission for the delivery system. The delivery system should be able to deliver hand sanitizer to a person's hands without the need to distract the driver all the while reducing the potential for product waste. The delivery system must be simple in operation so that small children can make effective use of the delivery system.

SUMMARY OF THE INVENTION

The liquid dispenser of the present invention addresses the aforementioned needs in the art by providing a system that easily and effectively delivers a liquid, namely a hand sanitizer, to the hands of a child riding in a vehicle without the need to distract or otherwise preoccupy the driver. The liquid dispenser is designed to be easily placed into and remain in position within the vehicle so that the present invention does not easily get displaced or otherwise lost so that the driver does not need to retrieve the lost or misplaced dispenser. The liquid dispenser is easy to use by a child, utilizing a mechanism that most children are familiar with. Product waste is minimized by the unique design of the liquid dispenser of the present invention. The liquid dispenser is of relatively simple design and construction, being produced using standard manufacturing techniques, so that the finished product is relatively inexpensive so as to make the product economically attractive to potential consumers for this type of device. Care and maintenance of the liquid dispenser, including refilling the liquid dispenser, is relatively simple and straightforward.

The liquid dispenser of the present invention is comprised of a receptacle that has a closed first bottom and an open first top and receives a liquid therein. The outer surface of the receptacle, proximate its first bottom, is dimensioned to be properly received and held within a typical beverage receptacle holder of a modern vehicle. A receptacle cap has a lower surface, an upper surface, and an outer first side wall, such that the upper surface and the first side wall define a liquid holding collection pool. The receptacle cap is removably attached to the first top of the receptacle such that the lower surface of the receptacle cap faces the first bottom of the receptacle whenever the receptacle cap is so attached. A pumping system has a dip tub, a pumping mechanism, and an actuator having a discharge port. The pumping system passes through the receptacle cap so that the dip tube extends below the lower surface of the receptacle cap and is received within the receptacle whenever the receptacle cap is attached to the receptacle and the actuator is located above upper surface of the receptacle cap and the discharge port of the actuator is located above and faces the collection pool. When the actuator is activated, the pumping mechanism draws a first portion of the liquid within receptacle into the dip tube and dispenses a second portion of the liquid out of the discharge port. An outer surface of the receptacle is generally cylindrical in shape, at least proximate the first bottom. An upper section of the actuator is U-shaped. A dome shaped cap has a second bottom and a second side wall having an opening therein. The dome cap is removably attached to a second top of the receptacle cap so as to receive the actuator within the dome cap. The dome cap is resilient so that it is pressed upon from the top in order to contact and actuate the actuator and thereafter resiliently return back to its original dome shape. The receptacle cap has an upwardly directed centrally disposed hub such that the pumping system passes through the hub.

BRIEF DESCRIPTION OF THE DRAWINGS

Similar reference numerals refer to similar parts throughout the several views of the drawings.

DESCRIPTION OF THE PREFERRED EMBODIMENT

Figure 1:
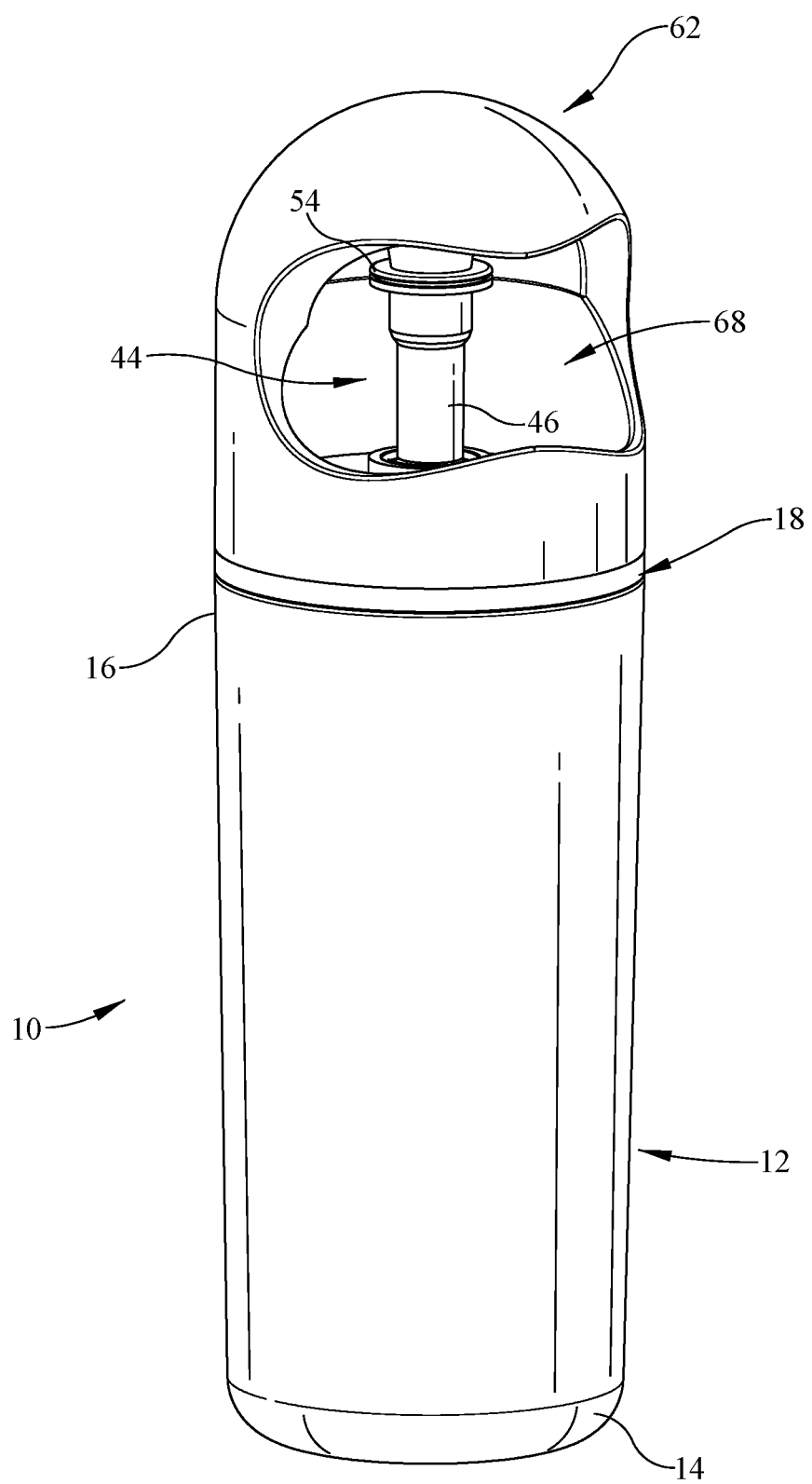
FIG. 1 is a perspective view of the liquid dispenser of the present invention.
Figure 2:
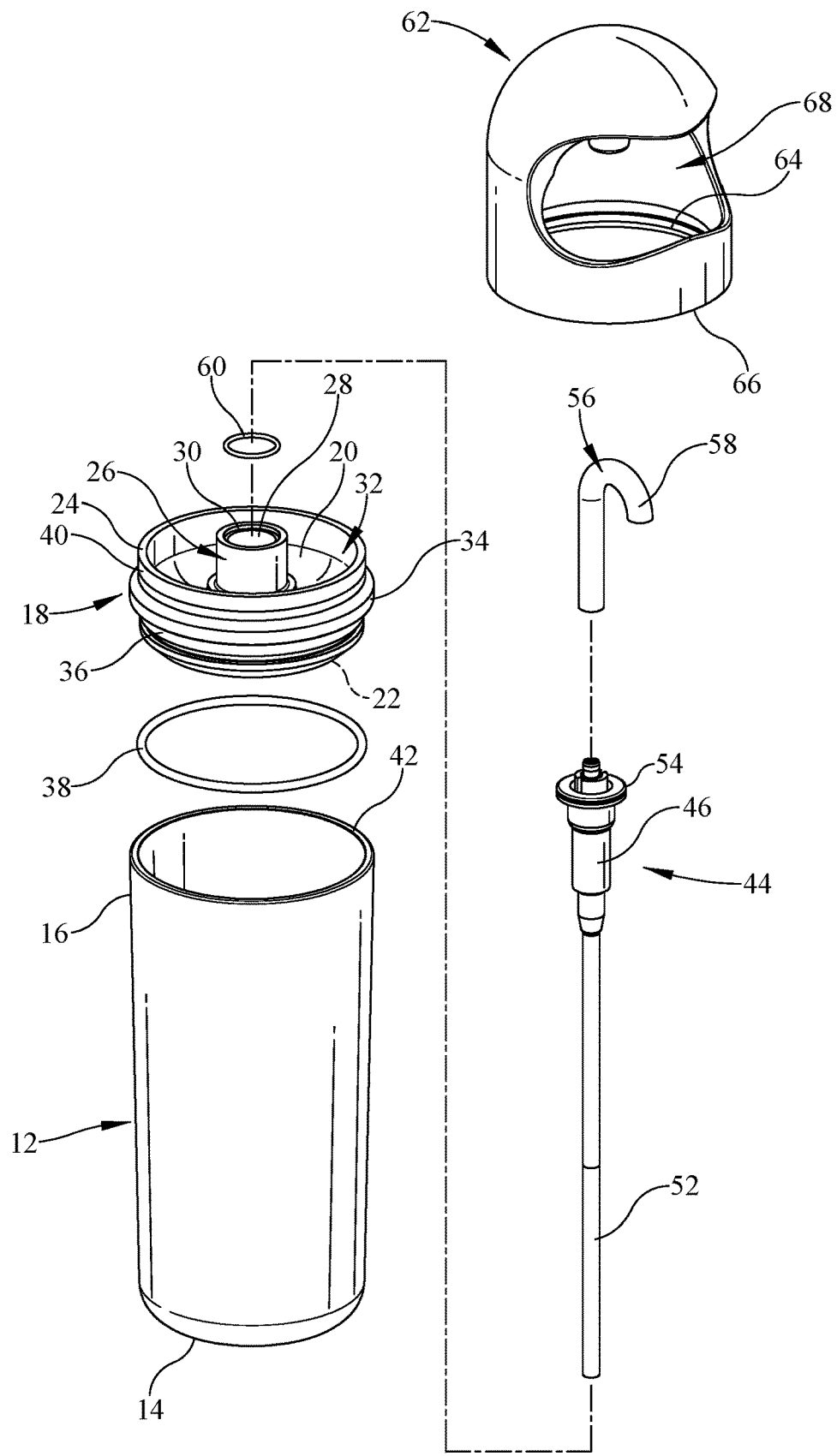
FIG. 2 is a partially exploded perspective view of the liquid dispenser.
Figure 3:
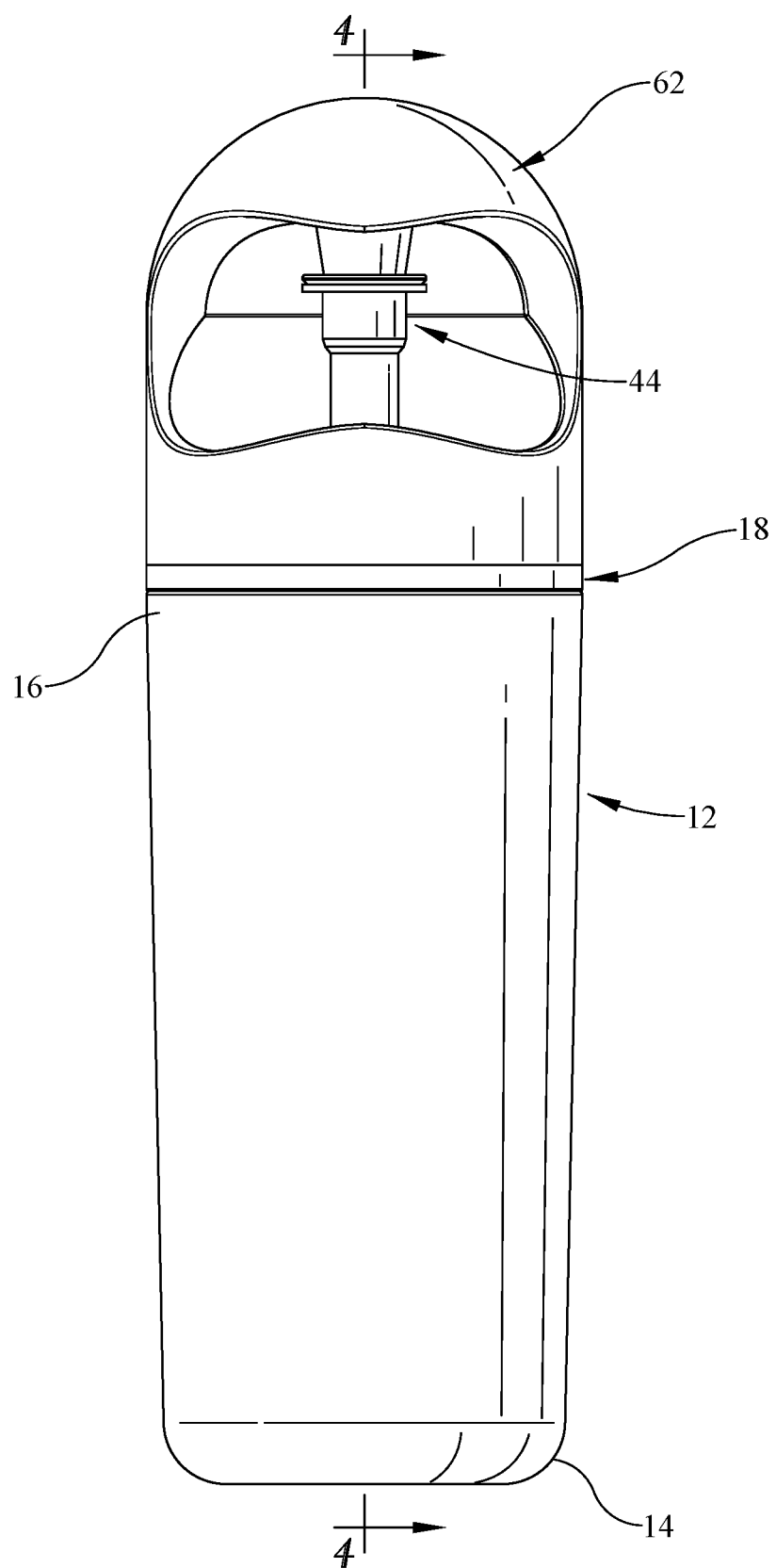
FIG. 3 is a front view of the liquid dispenser.
Figure 4:
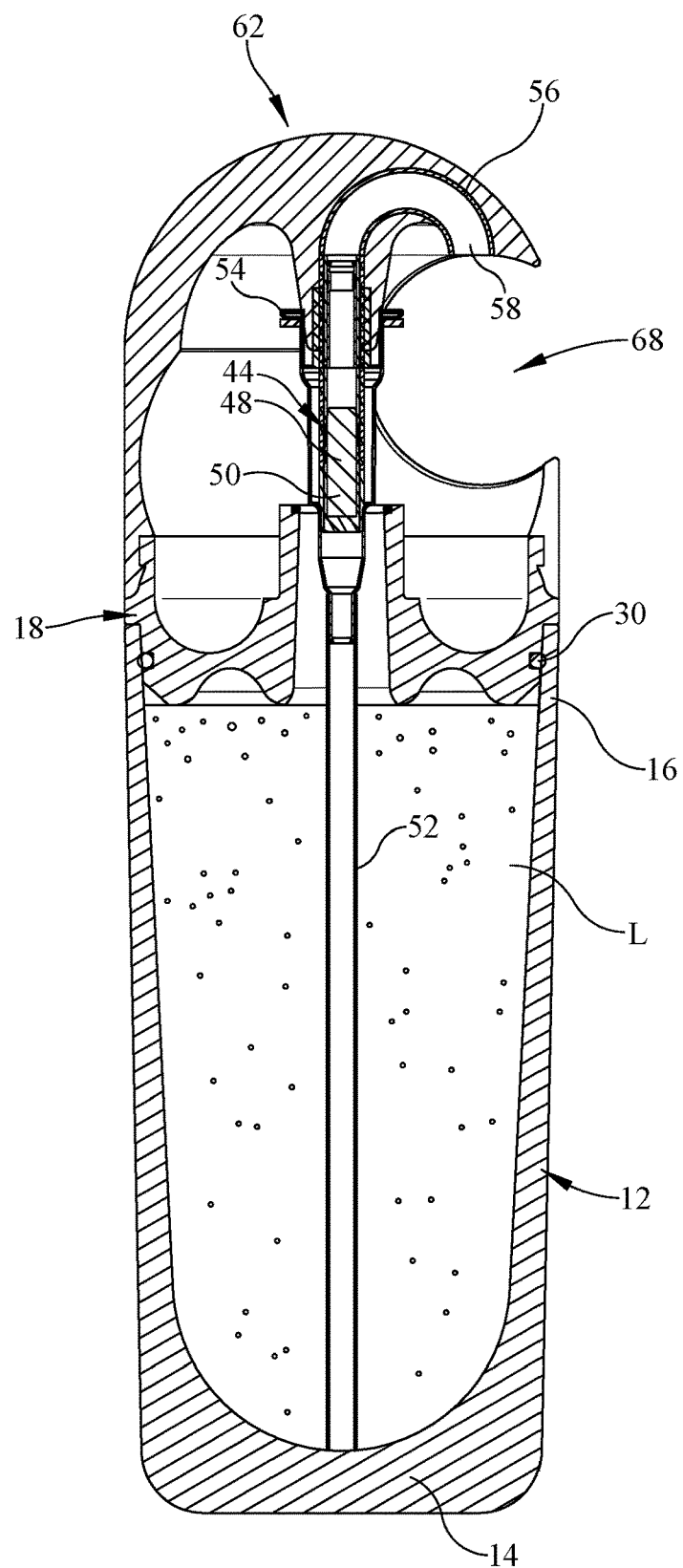
FIG. 4 is a sectioned view of the liquid dispenser, taken along line 4-4 in FIG. 3.

Referring now to the drawings, it is seen that the liquid dispenser of the present invention, generally denoted by reference numeral 10, is comprised of receptacle 12 for receiving the sanitizer L or other desired liquid therein, the receptacle having a closed bottom 14 and an open top 16. The receptacle 12, which can be made from a variety of materials, including plastic, aluminum, glass, and the like, has an outer surface that is generally cylindrical in shape (to include an outward taper of the outer surface), at least proximate the bottom 14, and is dimensioned so that the receptacle 12 properly fits into a typical drink holder found in most modern vehicles and securely remains within the drink holder during normal driving of the vehicle.

A receptacle cap 18 has an upper surface 20 and a lower surface 22 as well as a side wall 24. A central hub 26 extends upwardly from the upper surface 20 of the receptacle cap 18, the hub 26 having a through passage 28 centrally disposed therein and a seat 30 located within its inner surface proximate the hub's top. A collection pool 32 is formed by the upper surface 20, the outer surface of a portion of the central hub 26 and the inner surface of a portion of the side wall 24. As seen, an annular lip 34 encircles an outer surface of the side wall 24. A lower seat 36 encircles the outer surface of the side wall 24 below the annular lip 34 and receives an O-ring 38 therein while an upper seat 40 encircles the outer surface of the side wall 24 above the annular lip 34. The receptacle cap 18 is removably attached to the open top 16 of the receptacle 12 by pressing the lower portion of the receptacle cap 18 into the open top 16 of the receptacle 12, the receptacle cap 18 and the receptacle 12 at its open top 18 each being dimensioned so that the receptacle cap 18 friction fits into the open top 16 and snugly remains therein. The annular lip 34 sits on the rim 42 of the receptacle 12 whenever the receptacle cap 18 is secured to the receptacle 12. The O-ring 38 is pressed between the receptacle cap 18—receptacle 12 engagement in order to help keep the receptacle 12 spill proof whenever the receptacle cap 18 is attached to the receptacle 12.

Of course the receptacle cap can be threadably attached to the receptacle by providing appropriate corresponding threading on the receptacle cap and on the receptacle. Other attachment mechanisms can also be employed to attach the receptacle cap to the receptacle.

A pumping system 44 for pumping liquid out of the receptacle 12 is provided and comprises a housing 46 that holds the pumping mechanism. The pumping mechanism can be any appropriate pumping mechanism known in the art for dispensing the target liquid to be dispensed by the liquid dispenser 10 of the present invention, including possibly electrical pumping systems, and by way of example only, herein includes the illustrated piston 48 and spring 50. A dip tube 52 extends downwardly from the bottom of the housing 46. An annular lip 54 encircles the housing 46. A U-shaped actuator 56 having a discharge port 58 is secured to the housing 46 so as to be able to engage the piston 48 of the pumping mechanism. The housing 46 is received within the hub 26 so that the housing's annular lip 54 is received within the seat of the hub 26 wherein an O-ring 60 is located, the O-ring 60 helping make the housing 46—hub 26 juncture spill proof for any liquid that may be located in the receptacle 12. In this configuration, the dip tube 52 is located within the receptacle 12 and is dimensioned to terminate just above the bottom 14 of the receptacle 12.

Figure 5:
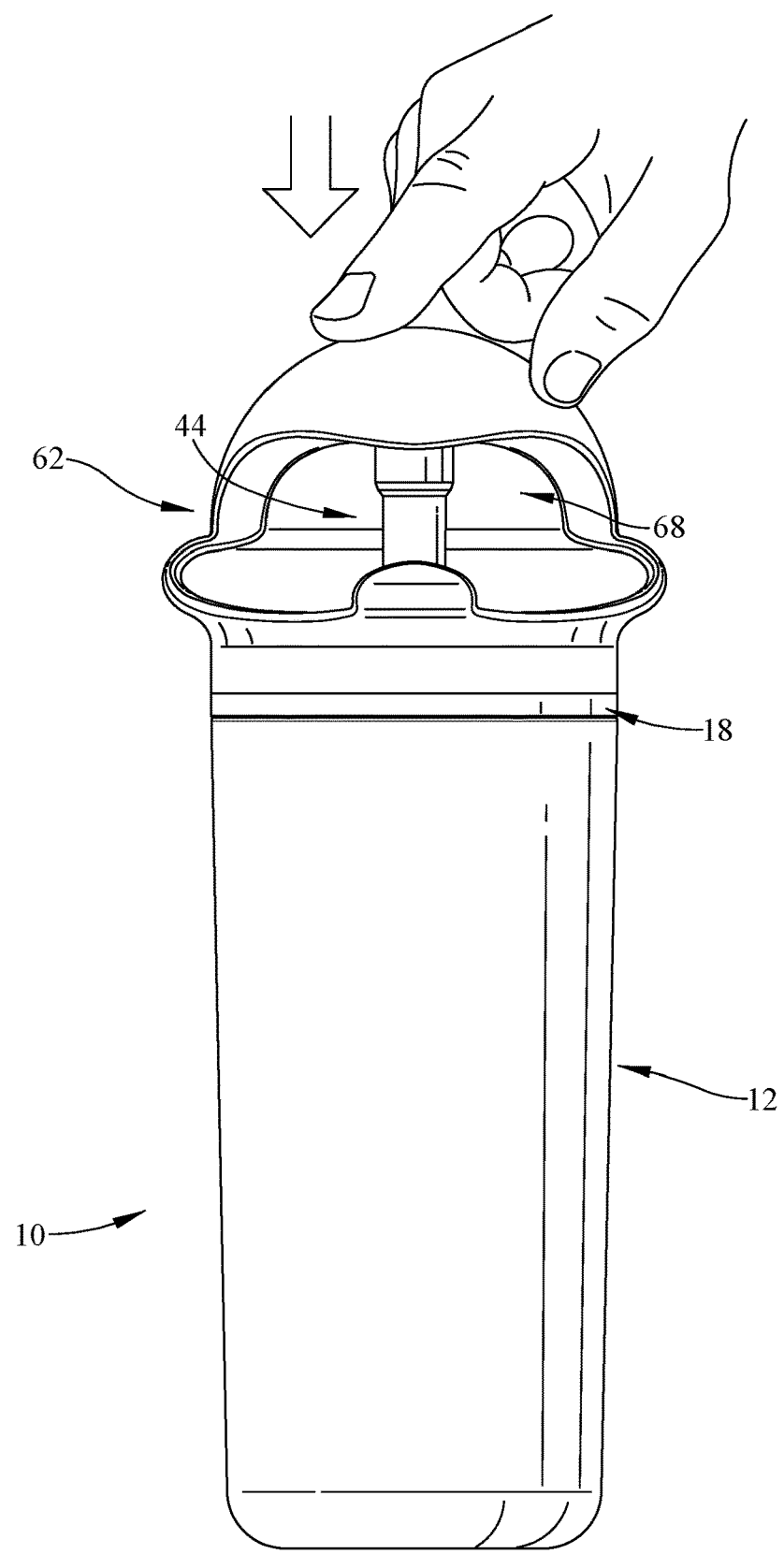
FIG. 5 is a perspective view of the liquid dispenser being activated via its resilient dome cap.

A domed cap 62 is made of silicon rubber or other such elastic material that allows it to compress and then return to its original shape with application and then release of pressure from a child's hand and arm is removably attached to the top of the receptacle cap 18. The domed cap 62 has an annular lip 64 encircling an inner surface of the domed cap 62 proximate the domed cap's bottom 66. An opening 68 sized to permit a user's hand to pass therethrough is located on the domed cap 62. The domed cap 62 is removably attached to the receptacle cap 18 so that the bottom 68 of the domed cap 62 is pressed onto the top of the receptacle cap 18 until the domed cap's annular lip 64 is received within the upper seat 40 of the receptacle cap 18. The domed cap 62 utilizes an annular reduction in thickness near its bottom 66, which due to its material, will bulge outward and allow the dome top to compress downwardly towards receptacle cap 18 in order to actuate the pumping system as seen in FIG. 5.

Of course the domed cap can be threadably attached to the receptacle cap by providing appropriate corresponding threading on the domed cap and on the receptacle cap. Other attachment mechanisms can also be employed to attach the domed cap to the receptacle cap.

In order to use the liquid dispenser 10 of the present invention, the receptacle 12 is filled with the desired liquid L. The receptacle cap 18 is secured to the open top 16 of the receptacle 12. The pumping system 44 is secured to the receptacle cap 18. The domed cap 62 is secured to the receptacle cap 18. The liquid dispenser 10 is positioned as desired, such as by placement into a vehicle's cup holder. As liquid L is desired, a user presses downwardly on the top of the dome 62 thereby pressing on the actuator 56, which presses onto the pumping mechanism, which causes a small amount of liquid L to be drawn into the bottom of the dip tube 52 and dispensed out the discharge port 58 of the actuator 56 onto the user's hand that is partially passed through the opening 68 of the domed cap 62—of course, if the pumping system is not primed, the pumping system is primed by several press cycles on the top of the actuator 56. If the user misses dispensing the liquid L onto his or her hand (or other implement presented to catch the liquid dispensed), the liquid L is caught within the collection pool 32 of the receptacle cap 18, allowing the user to scoop this captured liquid L with his or her hand. While the domed cap 62 is not strictly required for proper operation of the liquid dispenser 10, its presence helps keep the actuator 56 clean as well as otherwise protecting the actuator 56, helps prevent accidental actuation of the pumping system 44, helps tactilely guide a user's hand to the actuator 56, and helps keep any liquid L accumulated within the collection pool 32 from spilling out therefrom, and of course, makes pressing down on the actuator easy.

When the receptacle 12 becomes empty, the receptacle cap 18 is removed from the receptacle 12, the receptacle 12 is refilled, and the receptacle cap 18 replaced in the usual way.

While the invention has been particularly shown and described with reference to an embodiment thereof, it will be appreciated by those skilled in the art that various changes in form and detail may be made without departing from the spirit and scope of the invention.

We claim:

1. A liquid dispenser comprising:
   a receptacle having a closed first bottom and an open first top, the receptacle adapted to receive a liquid therein;
   a receptacle cap having a lower surface, an upper surface, and an outer first side wall, such that the upper surface and the first side wall define a liquid holding collection pool, the receptacle cap removably attached to the first top of the receptacle such that the lower surface of the receptacle cap faces the first bottom of the receptacle whenever the receptacle cap is attached to the receptacle;
   a pumping system having a dip tube, a pumping mechanism, a U-shaped actuator having a discharge port, such that the pumping system passes through the receptacle cap so that the dip tube extends below the lower surface of the receptacle cap and is received within the receptacle whenever the receptacle cap is attached to the receptacle and the actuator is located above upper surface of the receptacle cap and the discharge port of the actuator is located above and faces the collection pool; and
   wherein when the actuator is activated, the pumping mechanism draws a first portion of the liquid within receptacle into the dip tube and dispenses a second portion of the liquid out of the discharge port.

2. The liquid dispenser as in claim 1 wherein an outer surface of the receptacle is generally cylindrical in shape.

3. The liquid dispenser as in claim 1 wherein an outer surface of the receptacle, proximate the first bottom, is generally cylindrical in shape.

4. The liquid dispenser as in claim 1 further comprising a dome cap having a second bottom and a second side wall having an opening therein, the dome cap removably attached to a second top of the receptacle cap so as to receive the actuator within the dome cap.

5. The liquid dispenser as in claim 4 wherein the dome cap is dome shaped.

6. The liquid dispenser as in claim 4 wherein the dome cap is made from a resilient material such that placing a force on an outer surface of the dome cap causes an inner surface of the dome cap to depress the actuator.

7. The liquid dispenser as in claim 1 wherein the receptacle cap has an upwardly directed centrally disposed hub such that the pumping system passes through the hub.

* * * * *